ically insolated conductors and a substance which un-

United States Patent
Laing

[15] 3,668,373
[45] June 6, 1972

[54] EXCESS TEMPERATURE SWITCHING DEVICE

[72] Inventor: Nikolaus Laing, Hofener Weg 35-37, 7141 Aldingen bei Stuttgart, Germany

[22] Filed: Oct. 19, 1970

[21] Appl. No.: 81,797

[30] Foreign Application Priority Data

Nov. 4, 1969 Austria .......................... A 10334/69

[52] U.S. Cl. ........................................... 219/505, 338/25
[51] Int. Cl. ........................................................ H05b 1/02
[58] Field of Search .................. 219/499, 504, 505; 337/415; 338/25

[56] References Cited
UNITED STATES PATENTS 2,774,850  12/1956  Ziccardi .......................... 337/415

FOREIGN PATENTS OR APPLICATIONS 453,281  12/1948  Canada .......................... 337/415

Primary Examiner—Bernard A. Gilheany
Assistant Examiner—F. E. Bell
Attorney—Pennie, Edmonds, Morton, Taylor & Adams

[57] ABSTRACT

A temperature switching device for interrupting an electric circuit above or below a per-set temperature value having a temperature sensor formed as a hollow body containing two manually insolated conductors and a substance which undergoes a large change of resistivity at a well-defined temperature.

2 Claims, 5 Drawing Figures

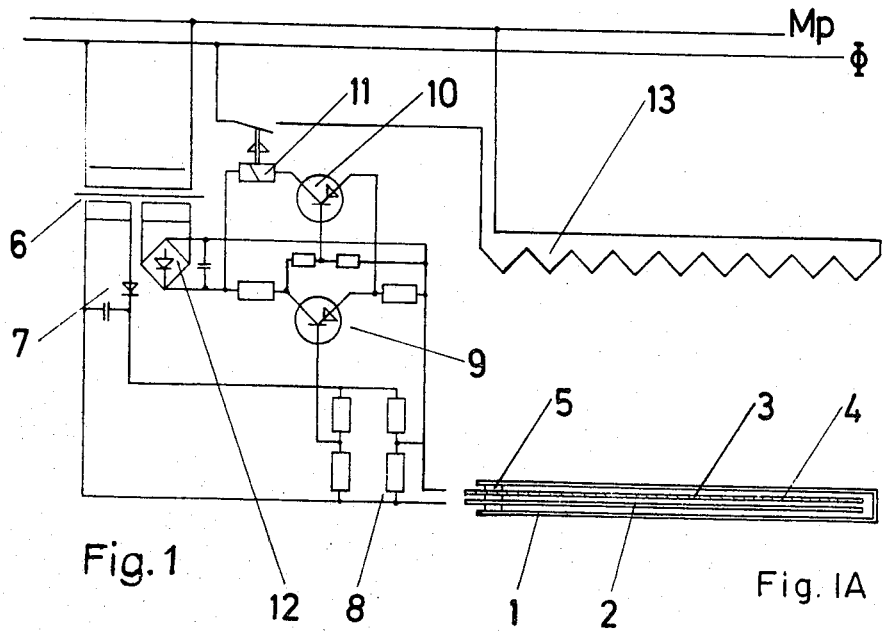
Fig. 1    Fig. 1A
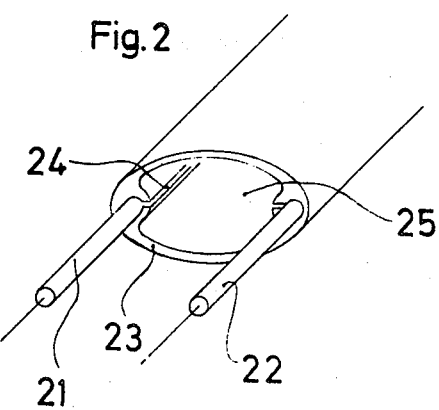
Fig. 2
Fig. 3
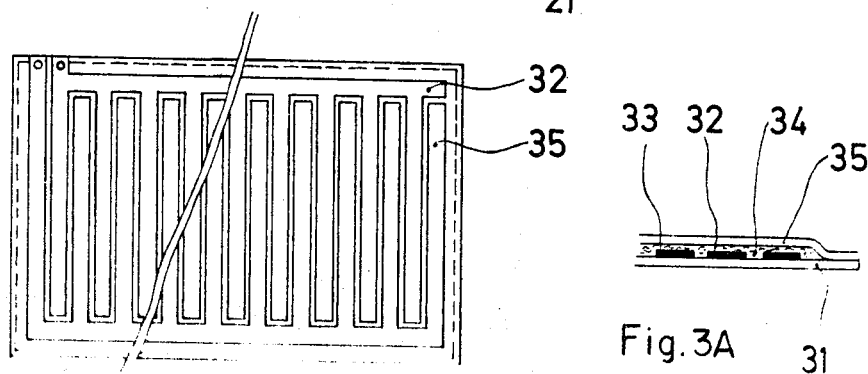
Fig. 3A 3,668,373

EXCESS TEMPERATURE SWITCHING DEVICE

THE PRIOR ART

Known temperature switches use as sensors elements in which a differential expansion of interacting bodies actuates the switching mechanism. There are many tasks of automatic control and supervision, which cannot be performed by such switches, particularly when the temperature sensors have to be of long extension.

OBJECT OF THE INVENTION

The need exists to protect pipelines of process plants against excess temperatures or, particularly with reference to the freezing danger, against temperatures below the desired value. This task could be accomplished hitherto only by controlling a large number of measuring sensors distributed over the entire plant.

DESCRIPTION OF THE INVENTION

The invention concerns switching appliances with measuring sensors which are not limited in length. According to the present invention, the properties of salts are utilized which are electrically non-conducting in the solid state whilst their melts, owing to their high ion mobility, have a high electrical conductivity. Measuring sensors according to the present invention consist, in their simplest form, of a metal pipe in which a metal wire with an insulation, permeable to liquids, such as braided cotton or mineral fiber, is enclosed whilst the remaining internal space is filled with a salt having a melting point corresponding to the desired switching (or triggering) temperature. In principle, all materials are suitable wherein a phase transformation takes place at the prescribed temperature provided there is a difference in electrical conductivity between the two phases. This always holds in materials which are built up partly or wholly of ion lattices. So long as the ions remain in the solid state, such materials have a high electrical resistivity. After the transition into the liquid phase, the ions become charge carriers of high mobility and produce a very large electrical conductivity. As soon as the salt filling melts at any point of the sensor which in principle can be of unlimited extension, an ion flow takes place at that point which is used for either a direct or, more usually, an indirect control action. Instead of a metal pipe, a plastics hose can be used. The current to be conducted through a sensor according to the invention should be as low as possible, so that, generally, amplifiers are necessary. A plastics hose would always be preferred when relatively large currents are to be conducted through the sensor. Conduction through molten ion-generating substances is always associated with electrolytic dissociation phenomena in which, together with easily soluble gases, hydrogen forms, which is contained in all suitable fusible materials. Plastics permit the hydrogen to diffuse through the walls. The higher the hydrogen permeability the more easily the trapping of gas can be avoided. In sensors with a plastics pipe, a blank, preferably metallic, wire is also enclosed alongside the braided wire. Some suitable salts are listed below.

| | | | |
|---|---|---|---|
| $KPO_3$ | Switching point | + | 810°C |
| $Ca(NO_3)_2$ | Switching point | + | 560°C |
| $NaNO_3$ | Switching point | + | 310°C |
| $LiNO_3$ | Switching point | + | 251°C |
| $LiNO_3Na_3$ | Switching point | + | 204°C |
| $NH_4NO_3$ | Switching point | + | 170°C |
| $AgNO_3$ | Switching point | + | 159°C |
| $H_3PO_3$ | Switching point | + | 70°C |
| $H_4P_2O_7$ | Switching point | + | 61°C |
| $H_3PO_4$ | Switching point | + | 42°C |
| $N_2CO_3 \cdot 10H_2O$ | Switching point | + | 34°C |
| $H_3PO_4 \cdot H_2O$ | Switching point | + | 29°C |
| $H_3PO_2$ | Switching point | + | 27°C |
| $Cu(NO_3)_2$ | Switching point | + | 24°C |
| $InCl$ | Switching point | + | 23°C |
| $Na_2CrO_4$ | Switching point | + | 20°C |
| $MoF_6$ | Switching point | + | 18°C |
| $ReF_6$ | Switching point | + | 15°C |
| $BrF_3$ | Switching point | + | 9°C |
| $H_2CO_2$ | Switching point | + | 8°C |
| $PF_5$ | Switching point | + | 6°C |
| $ASF_3$ | Switching Point | − | 6°C |
| $HNO_3 \cdot H_2O$ | Switching Point | − | 18°C |
| $TiCl_4$ | Switching Point | − | 25°C |
| $SnCl_4$ | Switching Point | − | 33°C |
| $HNO_3 \cdot H_2O$ | Switching Point | − | 37°C |
| $BrF_5$ | Switching Point | − | 60°C |

A temperature switch is characterized not only by the triggering temperature but also by the temperature interval before resetting. A temperature interval of zero is only rarely desirable because, in such a case, the switching device will be constantly fluttering at the switching temperature. Usually, intervals of varying magnitude are desired. If, for example, a device according to the invention is used to supervise the temperature of an electrically heated floor, the appliance should interrupt the current supply when, at any one point, for example, underneath a cushion inadvertently placed on the floor, the temperature exceeds the prescribed limit. The current should be switched on again only after the removal of the heat insulating object and when the floor has cooled down.

The invention solves this problem by the use of salts of high purity. All salts melt at a precise temperature determined by certain laws of nature. However, when cooling down, crystallization does not take place at the melting point but, according to the number of crystallization nuclei present, at a lower temperature. The temperature drop is the larger, the purer the salt used; in other words, the smaller the proportion of crystallization nuclei. On the other hand, the interval between switching-on and switching-off can be reduced by the admixture of isotropic or epitaxial crystals whose melting point lies above the switching-off temperature to any desired degree so that the opposite extreme of any desired resetting temperature interval, however small, can also be embodied by means of a temperature switch according to the invention.

DESCRIPTION OF THE DRAWINGS

FIG. 1 is a diagramatic illustration of a temperature switch constructed according to the invention;

FIG. 1(A) is an enlarged sectional view of a temperature sensor as used in FIG. 1;

FIG. 2 is an enlarged perspective end view of a different embodiment of a sensor;

FIG. 3 is a plan view of a still further form of sensor, and;

FIG. 3(A) is an enlarged sectional view of a portion of FIG. 3.

DETAILED DESCRIPTION OF INVENTION

The measuring sensor proper consists of a hose 1, which, for the underfloor heating application, has a bore of 3 mm, enclosing two metallic conductors 2 and 3. One of these conductors is surrounded with a braid 4 of insulating material. The braid prevents metallic contact between the wires 2 and 3 but does not fully screen the surface of the wire 2. At its switch end, the hose has a stopper 5 of insulating material. The hose can have any desired length, e.g. 20 m. At the far end, the hose is completely closed up. The hose is filled with a salt, e.g. sodium acetate trihydrate which has a low electrical conductivity. As soon as, at any point of the 20 m long measuring sensor, a region, however small, is heated to a temperature of 58°C, the salt filling melts. The melt has an electrical conductivity several orders of magnitude larger than that of the solid salt. A potential of a few volts is applied between the conductors 2 and 3, generated by the transformer 6 and the rectifier 7. The sensor forms a branch in the bridge 8 which is strongly detuned by the change of conductivity due to the local melting in the sensor. The transistors 9 and 10 amplify the resulting signal, when a pre-set threshold value is exceeded, and energize the winding 11 of a relay supplied by the rectifier 12. The relay switches-over and, in the present application, switches the underfloor heating 13 off.

FIG. 2 shows, in cross-section, a sensor according to the invention, in which the conductors 21 and 22 have no special insulation of their own but are moulded into an insulating hose 23 in such a way that, although positively embedded in the hose, they maintain a non-insulated surface 24 facing the inside of the hose. The inside of the hose 23 is filled with the salt 25 as defined by the invention.

FIG. 3 shows a similar sensor which is however constructed in a flat form. On a foil 31 of any desired size, the two electrodes 32, 33 are deposited as rake-shaped intermeshing layers. The salt 34 as defined by the invention, is deposited over the conductors as a thin layer covered by a second plastics foil 35 which is welded together (heat sealed) with the first foil 31.

I claim:

1. A switching device for the interruption of a circuit when the temperature is either above or below a pre-set value comprising an electrically controlled switch which breaks the circuit and a control circuit which, directly or through an amplifier, is actuated by a temperature sensor, characterized in that the temperature sensor is formed of a flat hollow body formed by a first and second foil welded together at their edges and having therebetween two mutually insulated conductors deposited on said first foil as thin rake-shaped metal layers covered by a thin layer of a suitable fusible substance and wherein the hollow body is filled with a substance which undergoes a large change of resistivity at a well-defined temperature.

2. A switching device for the interruption of a circuit when the temperature is either above or below a pre-set value comprising an electrically controlled switch which breaks the circuit and a control circuit which, directly or through an amplifier, is actuated by a temperature sensor, characterized in that the temperature sensor is formed as a hollow body containing two mutually insulated conductors with the body filled with a substance which undergoes a large change of resistivity at a well-defined temperature and wherein part of the device is arranged as a bridge circuit in which the sensor forms a branch.

* * * * *